United States Patent [19]
Auer et al.

[11] Patent Number: 6,067,637
[45] Date of Patent: May 23, 2000

[54] DATA REDUCTION TECHNIQUE FOR RULE BASED SYSTEMS

[75] Inventors: Paul Auer, Middletown; Fredrick Grizmala, Lincroft, both of N.J.; Michah Lerner, Brooklyn, N.Y.; Hiren H. Masher, Howell; Eric R. Sporel, Butler, both of N.J.

[73] Assignee: AT&T Corp, New York, N.Y.

[21] Appl. No.: 08/857,987

[22] Filed: May 16, 1997

[51] Int. Cl.[7] .................................................. G06F 11/30
[52] U.S. Cl. ................................. 714/26; 706/48
[58] Field of Search ................... 706/47, 48, 49, 706/916, 917, 50; 395/183.02; 371/51.1; 711/118; 714/26; 709/224

[56] References Cited

U.S. PATENT DOCUMENTS

| | | | |
|---|---|---|---|
| 4,890,240 | 12/1989 | Loeb et al. | 706/48 |
| 5,241,652 | 8/1993 | Barabash et al. | 706/48 |
| 5,265,193 | 11/1993 | Grady et al. | 706/48 |
| 5,388,189 | 2/1995 | Kung | 706/917 |
| 5,446,885 | 8/1995 | Moore et al. | 706/50 |
| 5,483,637 | 1/1996 | Winokuer et al. | 714/26 |
| 5,712,978 | 1/1998 | Lerner et al. | 709/224 |
| 5,737,497 | 4/1998 | Ballard | 706/47 |

OTHER PUBLICATIONS

Satori et al, "A multilayer perceptron solution to the match phase problem in rule–based artificial intelligence systems", Knowledge and Data Engineering, pp. 290–297, Jun. 1992.

*Primary Examiner*—Robert W. Beausolill, Jr.
*Assistant Examiner*—Christopher A. Revak

[57] ABSTRACT

A system for and method of pre-filtering data to create and/or maintain data in a working memory such that the data can be more efficiently used by an expert system. In one example, event triggers are used to enable efficient management of faults that occur in an expert system, such as faults that occur in connection with the interaction between a central system and a number of remote systems controlled by the central system. The event triggers filter data that is potentially relevant to the operation of the expert system, each event trigger comprising a match portion and an action portion. A processor compares the match portion of at least one of the event triggers to the potentially relevant data, and executes the action portion of any event trigger whose match portion matches the potentially relevant data, the execution comprising modifying the working memory. The evaluation of and execution of the event triggers occurs independently of other event triggers.

43 Claims, 2 Drawing Sheets

DATA REDUCTION TECHNIQUE FOR RULE BASED SYSTEMS

FIELD OF THE INVENTION

This invention relates to a technique for reducing the amount of data to be analyzed by expert systems and, in particular, to a system and method for pre-filtering data and storing the data for more efficient implementation in the expert system.

BACKGROUND OF THE INVENTION

Expert systems are widely used to perform complex operations and control a variety of applications. Such systems often apply a series of "inference experts" to data stored in a common memory (sometimes called a "blackboard") and make logical inferences based on the data. Actions are taken, including updating the data, based on the results of the inferences. Data may be input to the blackboard from a number of sources that are expected to have data useful to the inference experts.

SUMMARY OF THE INVENTION

The present invention is a system for and method of pre-filtering data to create and/or maintain data in a working memory ("WM") such that the data can be more efficiently used by an expert system. In the preferred embodiment, a software device called an "event trigger" provides data reduction of potentially large amounts of data, with concomitant focus of the expert system rules upon the relevant (i.e., reduced) data. In one example, the event triggers are used to enable efficient management of faults that occur in an expert system, such as faults that occur in connection with the interaction between a central system and a number of remote systems controlled by the central system.

The invention, in each of the preferred embodiments described herein, achieves advantages over prior art systems that apply expert systems to large amounts of data, much of which is not needed by the expert system. The preferred embodiments evaluate data and maintain a working memory for the expert system that includes less irrelevant data than prior art systems, significantly increasing the efficiency of the expert system.

In one aspect, the invention features a memory control system and method for maintaining a working memory used in connection with an expert system, the memory control system comprising a storage device including the working memory, a plurality of event triggers for filtering data that is potentially relevant to the operation of the expert system, each event trigger comprising a match portion and an action portion, and a processor for: (1) comparing the match portion of at least one of the event triggers to the potentially relevant data; and (2) executing the action portion of any event trigger whose match portion matches the potentially relevant data, and modifying the working memory.

In preferred embodiments, the event triggers add at least one element to the working memory, such as information concerning the status of one component of the expert system. The element(s) added to working memory can also comprise a portion of the potentially relevant data.

The expert system can be a system for controlling a plurality of remote processors from a central location. Furthermore, the invention can be used with an expert system that comprises a fault detection and correction capability with the working memory storing information relevant to the fault detection and correction. The remote processors can each implement telephone quality monitoring software. The potentially relevant data can comprise data concerning communications between the central location and the remote processors.

The processor preferably executes steps (1) and (2) for each of the event triggers independently of each of the remaining event triggers such that the modification of the data occurs independently for each event trigger. Using multiple processors, two or more event triggers can also be evaluated and/or implemented simultaneously.

In another aspect, the invention features an expert system for controlling at least one application, the expert system comprising a communications link for receiving information potentially relevant to the operation of the expert system, a storage area for storing data, and a comparator for comparing information received on the communications link to a predetermined set of criteria, wherein the expert system modifies data stored in the storage area based on results of comparisons performed by the comparator.

In preferred embodiments, the invention in this second aspect features a plurality of event triggers stored in a second storage area, each event trigger comprising a match portion and an action portion, the match portions of the event triggers specifying the predetermined set of criteria. The first and second storage areas are preferably portions of a single storage device, (e.g., a hard disk drive, RAM or other standard computer memory device).

The expert system preferably executes an action portion of one of the event triggers only if the comparator determines that the match portion of the one of the event triggers matches information received on the communications link. The expert system evaluates each of the event triggers for execution independently of each of the other event triggers.

In yet another aspect, the invention features a system for modifying data stored in a memory used by an expert system comprising a memory for storing data used by the expert system, a processor, and a plurality of event triggers, each the event trigger comprising a match portion that indicates a predetermined condition and an action portion that specifies a modification to the data in the memory, wherein the processor detects the occurrence of a predetermined condition associated with any of the event triggers independently of each of the other event triggers, and implements each action portion of each event trigger whose corresponding predetermined condition is satisfied such that the data in the memory can be independently modified by a plurality of event triggers.

In a still further aspect, the invention features a method for maintaining a working memory used in connection with an expert system, comprising the steps of maintaining a plurality of event triggers in a memory device, each event trigger comprising a match portion and an action portion, receiving potentially relevant data over a communications link, comparing a match portion of at least one of the event triggers to the received potentially relevant data, and executing the action portion of any event trigger whose match portion matches the potentially relevant data, the executing step comprising modifying the working memory.

DETAILED DESCRIPTION OF THE PREFERRED EMBODIMENTS

The data reduction technique of the present invention will now be described in the context of a system for detecting and correcting faults in an expert system. Specifically, the expert system described in our copending U.S. application Ser. No. 08/366,631, filed Dec. 30, 1994 and entitled "System For Control Of Remote Processors" (incorporated herein by reference) has been significantly extended and modified to incorporate a fault tolerance capability utilizing the data reduction technique of the present invention.

The expert system of the preferred embodiment is used to control applications remotely from a central location responsible for overseeing the remote applications. For example, AT&T uses a number of DOS PC computers dedicated to service-quality measurement of AT&T Direct$^{SM}$ inbound international calls. These remote unattended test stations, located around the world, execute telephone quality monitoring software.

A central location executes an expert system under the UNIX® operating system. The central location is responsible for overall management of the test stations and needs to transmit updated instructions and data to each remote PC, and to retrieve information from the PCs concerning the quality of the AT&T Direct$^{SM}$ service being implemented in the PC's area. This information is useful for maintaining a high quality of services in the remote areas.

Figure 1:
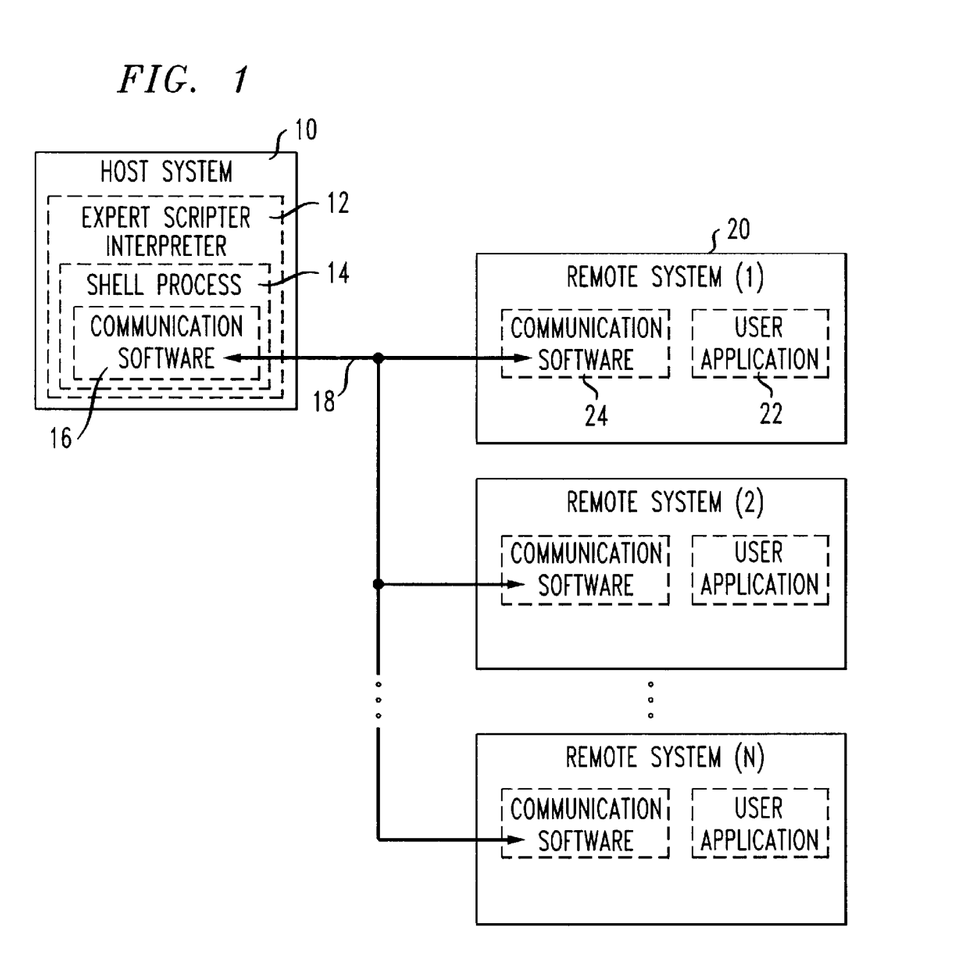
FIG. 1 is a block diagram of an expert system according to one embodiment of the invention.

Referring to FIG. 1, central host 10 includes an expert scripter/interpreter 12 (i.e., an expert system) that establishes a shell process 14 and includes communications software 16. The expert system is preferably implemented using multiple suitable processors to allow for simultaneous execution of certain operations, described below. The shell process 14 is a running program established for communication with a number of remote systems 20 (numbered 1–N), connected with host 10 via communications line 18. Shell process 14 communicates to remote systems 20 over communications line 18 using communications software 16.

Each remote system includes a suitable processor (e.g., a DOS based or other operating system based computer) that runs a user application 22 and includes communications software 24. The preferred communications software includes LAN Workplace for DOS and XPC with telnet daemon (telnetd) allows remote login from host system 10 to each of the remote systems 20.

Figure 2:
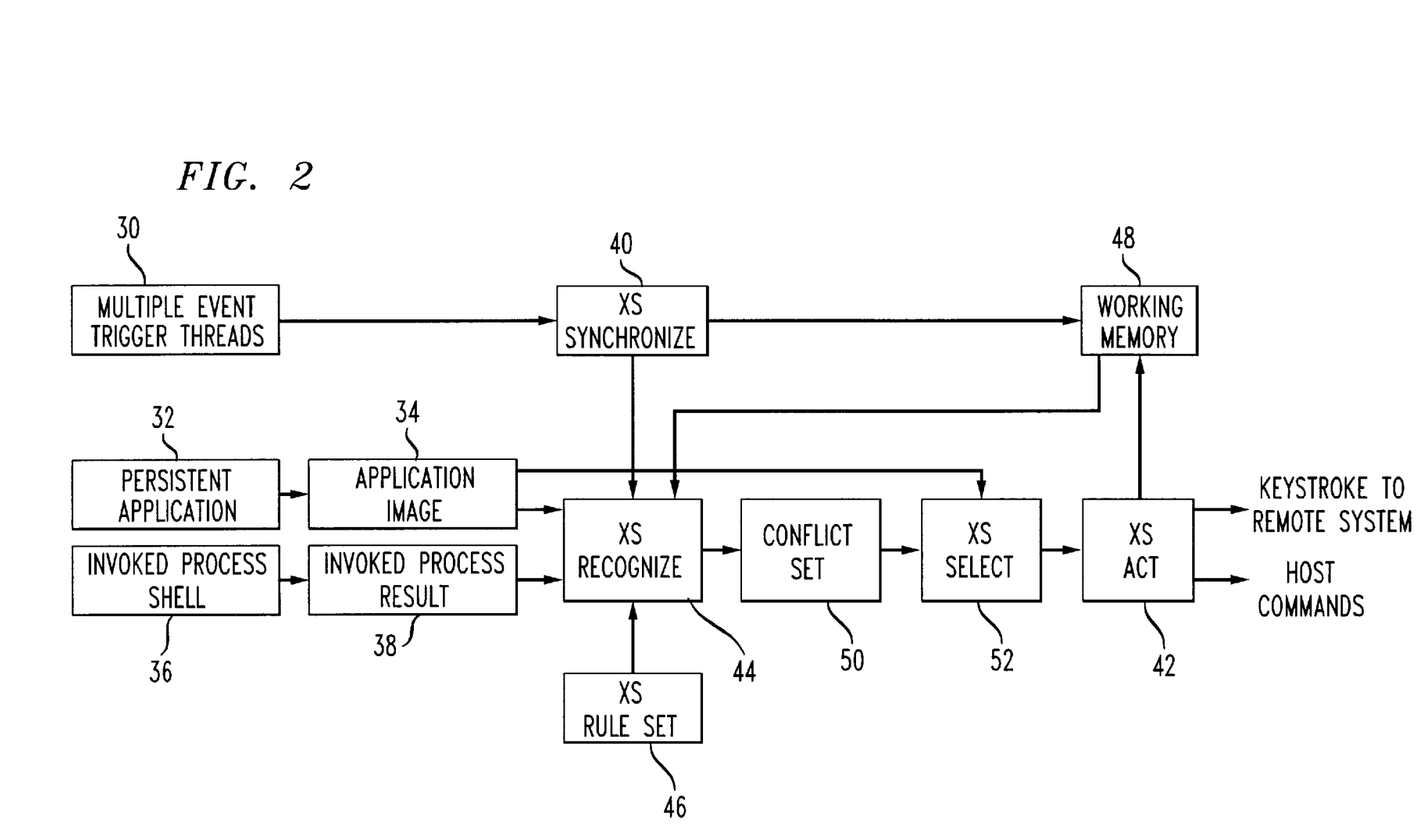
FIG. 2 is a functional block diagram of the invention implemented in the system of FIG. 1.

FIG. 2 is a functional block diagram which illustrates the operation of the preferred embodiment of the invention. The multiple event trigger threads 30 component represents a multiplicity of independently executing event triggers. Each event trigger receives information from rules that add a "ThreadMsg ident" tag to working memory 48, where the ident specified the trigger. Each event trigger can place information into the working memory by executing WMAdd or WMReplace routines. The memory modifications are placed into a single time-ordered queue. The modifications will then be made by the "XS Synchronize" block (discussed below). The reason for use of a queue is to ensure that working memory ("WM") changes are not made in the middle of a recognize-select-act cycle, and further to ensure that event trigger modifications are more recent than other changes, due for example to the act cycle. The add and replace routines specify the new working memory, and in the case of the WMReplace, the prefix in working memory that is to be replaced with the new data.

The function of the event triggers is data reduction. One application of data reduction is real-time fault detection, discussed in detail below as an example of the invention. One significance of this application is that a suitable rule-set exploits this real-time information to modify the conflict set and thereby invoke corrective actions.

The persistent application 32 has two functions, a receive/act function and a respond function. In the receive/act function this component receives character sequences as a result of the selected rule issuing a "response". The character sequences are passed to any UNIX® application as specified at program startup. Typically one specifies the UNIX® shell (/bin/sh or /bin/ksh) as the persistent application. This permits the use of any UNIX® program by providing commands to the shell. Our script typically issues a number of UNIX® commands, and then invokes the telnet communications program to interact with a remote site.

In the respond function this component receives character responses as a result of the UNIX® application that was selected at startup, or which was activated by a subsequent command to the initially invoked application. The character responses are then decoded and placed into the application image (the description of that item immediately follows). Decoding is necessary because screen control information is often included in the data by the application, and this data must be decoded to obtain an accurate representation of the transmitted screen. Prior screen information is also saved.

The application image component 34 is a repository of the output generated by the user-selected application. This component is accessed in a write-only mode by the user-selected application. This component is accessed in a read-only mode by the XS Select component 52 (discussed below).

The invoked process shell component 36 executes any actions that are specified by the action component of the selected rule. The actions are passed into a new UNIX® shell. The invoked process shell terminates with a return code upon completion of the requested action.

The invoked process result component 38 specifies the status of the invoked process. The status information includes the process identification (PID), the time the process was invoked, the name of the rule that invoked the process, and either the completion code or a designator that the process is still active.

XS Synchronize 40 processes a queue of WMAdd and WMReplace requests, and utilizes industry-standard semaphores to ensure exclusive access to the working memory. The XS act 42 and XS recognize 44 (discussed below) must obtain the semaphore before they can read or write the memory. The multiple event trigger threads 30 do not require the semaphore because they write into a queue of memory modifications. XS Synchronize 40 processes the queue immediately before the start of any match cycle.

XS Rule Set 46 is a set of expert system rules provided by a domain expert and read into the interpreter when it starts. It is typically read in from a saved disk file.

Working Memory 48 is a structured and time-ordered sequence of working memory elements (WMEs). It is initially empty. Items are added to it by the XS Synchronize 40 and the XS Act 42 components.

XS Recognize 44 is a software component that combines the rules with the working memory. The function is to decide which rule and working memory combinations have become eligible for use, and which previously eligible rules and working memory combinations are no longer valid. The ordered output of this is the Conflict Set 50. The rules' "match" parts are evaluated by this component, and values are assigned to variables in the rule as needed.

Conflict Set 50 is a collection of matching rules with references to the WMEs that these rules matched. One rule can match multiple WMEs. The conflict set is ordered according to the recency of the WMEs.

XS Select 52 chooses exactly one rule on the basis of the ordering of the conflict set, pattern matches to the screen memory and logical conditions defined by each rule. The pattern element of the current rule specifies the target patterns in the application memory, and the line element specifies a range of lines where the match must occur to activate the rule. The line may specify a constant range of lines, patterns by use of the Pattern(expression) and PatternTop(expression) designators, as well as a combination of patterns and constants.

XS Act 42 implements the actions of the selected rule. This instantiates the response field (the response is a character sequence to be transmitted to the remote system) and the actions field (the action is the commands to be executed locally on the XS machine). The instantiation substitutes variables of the response or action with the values assigned during the WM and screen matches. The XS Act also instantiates the specification of WME to add and delete from the global working memory. Transmission of the result is started by interface to the UNIX® I/O subsystem. Execution of the action is invoked by creating a new UNIX® fork. The deletions and additions to working memory are then made. Partially instantiated patterns can be deleted from the working memory, since these delete any WME that matches the pattern. Additions that begin with the ThreadMsg prefix are transmitted to the specified event monitor thread. The system's next action is determined by the value of the selected rule's readmore variable: it can begin the next match cycle immediately, await for output into the virtual terminal subsystem, await completion of any invoked actions, or wait for both output and completion.

In an example of the preferred embodiment the remote systems are monitoring a long distance service. The user application 22 (See FIG. 1) in each remote system 20 receives input from a telephone network that provides services to customers (e.g., AT&T Direct$^{SM}$ calls from outside the U.S. to a destination within the U.S.). The host system 10 will perform the following actions to interact with the operation of the remote systems 20:

(1) Connect to a remote system 20 and:
  ◆ Log into the remote system
  ◆ Determine the status of the remote system; this may require full-screen analysis (explained below)
  ◆ Log errors and correct if appropriate
  ◆ Execute interactive programs with the remote system
  ◆ Perform file-tansfer to the remote system
  ◆ Manipulate the remote system from the host system
  ◆ Restart the remote monitoring process
(2) Process the results
  ◆ Place the results into a database
  ◆ Monitor exceptional conditions
(3) Detect and correct for error conditions
  ◆ Detect loss of communication, errors in communication protocol, or remote-site errors
  ◆ Determine and implement corrective actions The software run by the remote systems (i.e., the user applications 22) displays the system status on the remote system's monitor, and periodically executes pre-scheduled programs. The output of each user application is to the remote monitor and disk; and input is from its keyboard and the disk. The remote communications software 24 accepts keyboard input from the communications line 18 and transmits output to the system communications software 16.

Table 1, below, lists the system components, connected as shown in FIG. 1, with further explanation. The central host executes the expert system or "interpreter" and the outbound connections to the remote systems. The interpreter reads and writes to the local processes, invokes the communication programs that connect the local with the remote to permit the interactive interchange of data when the remote system makes modifications or updates to the information presented by the remote screen, and maintains a full screen image of the remote process. That is, the interpreter will duplicate locally (i.e., at the host) the screen display at the remote system. This enables the interpreter to access all of the information that the user application displays on its screen. The "rules" used by the expert system are explained further below and enable the execution of actions in response to data received from the remote system.

TABLE 1

System Components

| Component | Purpose | Location |
| --- | --- | --- |
| Central Host | Execute expert system | Local |
| Expert System Controller | Recognize state of remote, select an appropriate rule, execute rule on local and remote systems | Central Host |
| Rules | Defines states, transitions and actions | Central Host |
| Connectivity, TCP/IP with PPP, ethernet, tip, or cu | Communication | Central Host (Morningstar PPP) Remote (Novell LWP with XPC) |
| Remote Controller | Permit control of remote system (keyboard and screen) over communication line | Remote DOS uses Novell XPC UNIX uses telnetd |
| Remote Systems | Execute application | Remote |

Remote control software, active on the remote, presents the remote system's application to the host (local) interpreter. The rules then determine the state of the remote and execute appropriate actions both locally (i.e., at the host) and remotely.

Statements or "rules" in the interpreter "language" are match-pattern/action pairs. The match-pattern portion specifies a required state of the local memory ("match" portion) and the configuration on the remote screen ("pattern" portion) for the rule to be implemented. The action states the response that is transmitted to the remote (if the rule is selected for execution), plus the statements to be executed locally at the host.

The host system operates on three forms of memory: rules memory, working memory, and the remote screen memory. The rules match the working memory and screen. In other words, the rules describe the conditions that the expert system will respond to, based on the content of working memory and the remote screen, and the actions that it will perform. Thus, it matches patterns in the working memory and the remote screen memory, and tests logical conditions on the result.

The working memory is a structured list of character strings. It represents partial results accumulated during interpretation of the rules. Elements are added to, as well as deleted from, the working memory during system operation. Its uses include storage of system state, work item lists, partial results, and data carried between steps.

The remote screen memory or pattern memory is the full screen representation of the remote system display (or other shell process). This is maintained current by interpreting the control codes of the input stream from the remote processor to perform, for example, the ANSI (vt100) functions such as insert/delete/move-cursor. In other words, all of the data generated by the user application to control the display at the remote system is transmitted to the shell process of the host system so that the duplicate screen at the host can be maintained and updated when appropriate.

The transmission of the data from the remote system to form the remote screen at the host can begin under the control of the host, e.g., with the host sending a command to the remote system. Alternatively, the host can simply log into the remote system and start receiving data automatically. Either way, it is preferable that updates to the remote screen be sent to the host automatically as the remote process updates the remote screen.

The expert system performs an execution cycle that has the following basic steps:

1. Update: check the completion status of running actions
2. Recognize: find all rules that match the working memory (computes the Cartesian product of matching memories and rules)
3. Select: perform a screen memory match and conditional logical test on the rules that passed the above test, and select one rule according to conflict-resolution method
4. Act: execute the rule, which consists of a remote-action, a local-action, working memory modifications, and control-state modifications
5. Wait: optionally, await completion of actions or receipt of input Multiple data reductions can be performed concurrently as described below.

The system additionally monitors resource utilization, and adds the special working memory "RESOURCELIMIT" if these resources are exceeded. Thus, limits on memory use are established and are not exceeded.

As noted above, each rule includes a match portion, a pattern portion, and an action. Other possible components of a rule are listed in Table 2 below.

TABLE 2

Rule Components

| Item | Purpose | Syntax | Variables |
| --- | --- | --- | --- |
| label | Identify the rule | String | (none) |
| match | A list of extended regular expressions and/or negated regular expressions that must/must not be found in the working memory to permit consideration of the rule. | See Solaris ® regcmp (3G) documentation | Assigns matched results to variable $W0 to $W9. |
| pattern | An extended regular expression that must match the screen memory to permit consideration of the rule. | See Scolaris ® regcmp (3G) documentation | Assigns matched pattern results to variables $0 to $9. |
| line | Thr range of screen lines where the pattern is eligible to match the output of the persistent shell process or remote screen. The Bottom and BottomSkip options are not valid for *from*, and the From option is not valid for *to*. | *from* or *from:to*, where: *from* and *to* are defined as:<br><lineno> ¦ Bottom ¦ Top ¦ Bottom <addOp> <int> ¦ From <addOp> <int> ¦ BottomSkip(<pattern>) ¦ BottomSkip(<patt>)<aOp> <int> ¦ Pattern(<pattern>) ¦ Pattern(<pattern>)<aOp> <int> ¦ PatternTop(<pattern>) ¦ ¦ PatternTop(<patt>) <aOp> <int> | (none) |
| condition | A list of parenthesized arithmetic or logical statements that are first instantiated with the value that matched the working-memory and pattern elements, and then evaluated to determine if rule satisfies the condition(s). | expression relop primary; *Primary* is variable, value or function. *Expression* is primary or primary operator expression. *Relop* is lt, le eq, ge, gt, and compares the expression with the primary. *Variables* are $0, . . . $9, $W0, . . . $W9. *Value* is real, and the *functions* are listed in Table 4. | $i, $Wi, environment. |
| response | A command that is instantiated with memory and pattern elements, and then transmitted to the remote | Character sequence with variables, functions, \n (newline) \r (return) \w (wait) and \\ (\\) | $i, $Wi, environment, $ADD, $SUB |
| action | A command that is instantiated with memory and pattern elements, and then executed locally | Character sequence with variables, functions, \n (newline) \r (return) \w (wait) and \\ (\\) | $i, $Wi, environment, $SHELL |
| add | A list of working memory patterns to be added to working memory after instantiation with the match and pattern elements | Sequence of variables, values and functions, or parenthesized sequences of such sequences (nesting allowed) | $i, $Wi, environment $ADD, $SUB, $SHELL |

TABLE 2-continued

Rule Components

| Item | Purpose | Syntax | Variables |
| --- | --- | --- | --- |
| delete | A list of working memory patterns to be deleted from the working memory after instantiation with the match and pattern elements | Character sequence with variables, function, \n (newline) \r (return) \w (wait) and \\ (\) | $i, $Wi, environment, $ADD, $SUB $SHELL |
| log | A log entry that is prefixed with the date, time, user id and directory where the scripter is executing | Character sequence with variables and functions. | $i, $Wi, environment, $ADD, $SUB, $SHELL |
| priority | Rule priority overrides time stamp based conflict resolution. | Numeric (integer value) or mnemonic (normal, high, readscreen) | |
| readmore | Require shell response or completion of action before beginning next rule-cycle. | quiesceRunning, activeComplete, activeRunning, continue | |
| mods | Modification to rule count and system parameters | Sequence of assignments (\special = value;) | Rule count and resource control |

The modification codes or "mods" listed in Table 2 are used to alter the rule count or other system parameters, and include the codes listed in Table 3 below.

TABLE 3

Modification Control Codes

| Variable | Function |
| --- | --- |
| \d = | Milliseconds without data receipt until end-of-input is assumed |
| \x = | Number of milliseconds without any data before error is signaled |
| \ST \SR \SP \LT \LR \LR \UT \UR \UP | Resource control: limits from Start, Last-rule and User-stamp for Time, Rules-fired and Pokes-sent (i.e., ST is Time from Start, UP is Pokes from Used-Stamp) |
| \USTAMP | Store the current resource limits into the user-stamp |

During the "recognize" step, the match portion of a rule is compared to components from the working memory. The Cartesian cross-product of all combinations of matched memory items is computed in time linear in the cross-product size. (The cross-product is efficiently computed by formation of a permutation table that consists of the correct number of rows, initialized with the indices to the columns of data.) The matches are sequenced according to the time stamps of the matched memories. Such a process is well known and is shown, e.g., in Forgey, C., and McDermott, J., "The OPS Reference Manual" Carnegie-Mellon Univ. Dept. Compu. Sci., Pittsburgh, Pa., 1976 (incorporated herein by reference). The working memory match binds variables $W0, $W1 . . . $W9 (in the working memory) to the values matched by the subexpressions of the match expressions. The set of all matching rules will then be considered in a comparison of the pattern portion of the rule to the data in the remote screen (as duplicated in the host).

Next, in the "select" step, the expert system checks if any matched rule also matches the current remote screen. The pattern match gives variables $0, $1 . . . $9 (in the remote screen memory) that contain the values bound to the sub-expression of the pattern expression. These values are used in the subsequent condition, response, action, add and delete steps. This and subsequent steps may all use the functions and variables described in Table 4 below.

TABLE 4

Execution-time functions and variables

| Function/Variable | Purpose |
| --- | --- |
| $SHELL (expression) | Execute subshell, use shell's numeric exit status |
| $ENV (symbol or variable) | Use UNIX environment value for the symbol or variable |
| $ADD (expression1 expression2) | Dyadic addition |
| $SUB (expression1 expression2) | Dyadic subtraction |
| $GTIME | Universal time (GMT) |
| $GDATE | Universal date (GT) |
| $LTIME | Local time (EST) |
| $LDATE | Local date (EST) |
| $RNAME | Remote system name |
| $HOST | Host name |
| $SCRIPT | Script name |
| $varname | Use UNIX environment value for varname, if not one of the special variable names listed above in this table |

Once a rule satisfies the "match" and "pattern" components, the condition is evaluated by use of the variables that were preserved from the match and pattern phases. The first rule that passes these tests is called the "matched" rule, and its actions will be executed.

A "conflict" is said to occur when multiple rules are identified by the working 1 memory and screen matches. In this case, one of the qualified rules must be selected by a "conflict resolution" procedure. There are two crucial features of conflict resolution, namely:

1. A rule with newer working memories is activated before a rule with older working memories.
2. A rule with more working memories is activated before a rule with fewer working memories.

The correct use of recovery information is a crucial part of any time based system. For example, consider a rule that runs the DOS chkdsk program on a remote. This action may locate several kinds of disk errors, with a remedial action to be determined by the severity of the error. Typically one logs the error, transfers the result to the central host, and possibly attempts corrective action. These activities may be invoked by adding appropriate working memory elements, in the correct order. For example, the following rule:

add: (Action CorrectError)(Action TransferError)(Action LogError)

creates three new working memory elements, each with a unique timestamp:

Time1: CorrectError

Time2: TransferError

Time3: LogError

A rule that matches the LogError memory will be activated prior to a rule that matches the TransferError or CorrectError memory. If the addition to working memory had been made in a different order, then erroneous results might occur. For example:

add: (Action LogError)(Action TransferError)(Action CorrectError)

creates the timestamps:

Time4: LogError

Time5: TransferError

Time6: CorrectError

The rule that matches CorrectError will now match first, with the consequences that the TransferError provides erroneous results, and the LogError will not find any error to correct.

The recency rule also applies with multiple working memory matches. Consider rules that match memories with the following timestamps, listed as rule:(stamp$_1$, stamp$_2$ . . . stamp$_n$), specifically:

Rule1: (10 8 6 4)

Rule2: (10 8 6)

Rule3: (10 9)

Rule4: (11)

These will be considered in the sequence Rule4, Rule3, Rule1, Rule2. This is equivalent to lexical ordering where a special "last" character is appended to each sequence. Ties are resolved in favor of rules that are earlier in the rule script source.

An example of a rule, expressed as a consequence of field names and values, is shown below:

Label: sample

Match: (Name ([A-Z] [a-z]*)$1)

Pattern: $Enter user name: ^

Condition: $W1 .ne. "Babbage"

Response: $W1\n

Log: Notice: entered user login name

Add: (Logged in $GTIME)

Rule execution substitutes the matched values into the action and response portions of the variable (i.e., instantiation). The response is transmitted to the remote system. Once the action is complete the add and delete portions are instantiated and the appropriate changes are made to working memory. Any modifications listed in the mods are then executed. These may change system parameters, such as the output trace level and communication-related timers.

To detail the execution cycle:

1) Check for completion of actions (i.e., forked processes). Indicate completion by changing the WME (action rulename ACTIVE) to (action rulename RC returnCode).

To detail the execution cycle:

2) Read any messages from event triggers, and perform the working-memory actions indicated. These are to replace, add or delete. A replacement ignores the :COMMENT field if present. A replacement for the pppLink prefix-WME replaces any pppLink WME.
3) Update the conflict set:
   - Compute a copy of the conflict set, called interim conflict set:
     - Identify the working memory elements that match each regular expression variable in the "match" part of the rule
     - Form the Cartesion cross-product of these elements (in time equal to the number of results)
     - Place the results into the conflict set according to the rule-priority, number and time-stamps of the memories. rules with negated woking memories may be added to the conflict set upon deletion of a WME.
   - Select those items in the interim conflict set that meet either of the following conditions, and add to the conflict according to rule-priority, number and time-stamp.
     - Match a WME that was added to the WM during the most recently executed rule, or
     - Match a negated WME that was deleted during the most recently executed rule (i.e., the system "shadows" the deleted WME values to recognize the deletion of the WME values).
4) Select the most relevant rule:
   - For each result in the conflict set:
   - For each line in the "line" component of the rule
   - Evaluate the "line" options including Pattern(pattern), PatternTop(pattern), BottomSkip(pattern), From, To, Bottom, Top and expressions containing these and constants. This gives a match region into the virtual terminal screen.
   - If the regular expression pattern and variables in the "pattern" match the current line of the current screen.
     - Evaluate the conditional expression (if any). Substitute a matched value from the working memory match for each Wi variable in the "condition" expression. Substitute a matched value from the screen match for each $i variable in the "condition" expression.
     - Evaluate each "condition" as a logical expression.
     - If all conditions are satisfied, then the matching rule has been found; proceed to the next step.
5) For the matching rule (if any):
   - Instantiate the "action", "response", "add" and "delete" components using the match working memories and pattern memories.
   - Transmit the response to the persistent application (this may be connected to another process, such as communication, to effect an action at a remote)
   - Execute the action on the local system
   - Delete old items from the working memory. Only the first matching working memory (i.e., youngest) will be modified.
   - Place new items into the working memory, each with a newer and unique timestamp
     - A message is sent to a thread program when an ADD command adds a WME of the format (ThreadMsg key message). The instantiated message text is placed into the message queue for the thread designated by the key.
   - Remove the executed rule from the conflict set
   - Execute the "modifications" of the rule
6) Optionally, delay before beginning the next match cycle:
   - delay a specific time
   - delay until completion of this cycle's locally invoked action
   - delay until the virtual terminal subsystem receives output and is subsequently quiescent for DELAY_MAX milliseconds (this can be changed by the mods: \d=xxx option). If there is no output at all for READFAIL_MAX milliseconds (setable by mods:\r=xx), terminate the delay and place the (READFAIL ruleName) WME into the WM
   - delay for both completion of the action and the output
   - do not delay at all.

The resource control variables are shown in Table 5, below. The "T" suffix indicates time, and the "R" suffix indicates rules executed. The S, L and U prefixes indicate start, last rule, and user stamp, respectively.

TABLE 5

Resource Control Variables

| Measured From | Elapsed Time | Number of Rules Executed |
|---|---|---|
| Script Start | \ST | \SR |
| Last Rule | †LT | \LR (not useful, always 1 since last rule) |
| User Stamp | \UT | \UR |

The three variables \ST, \SR and \SP are measured from the start of the program execution. The value of \ST is the maximum number of seconds the program may execute. The value of \SR is the maximum number of rules the program may execute. A value of zero indicates there is no limit for the resource.

The values of \LT and \LR are measured from the last rule executed. The "\LR" option would not be useful, but is included for completeness.

The values of \UT and \UR are measured from the occurrence of a \USTAMP in the "mods:" portion of a rule that has been executed. When the USTAMP occurs, the current time, rule count, and poke count are stored. When the difference between and actual and the stored value exceeds the \UT or \UR value, then a resource exceeded condition has occurred.

Upon exceeding resource the working memory value "RESOURCELIMIT" is initiated without reading from the remote system. There should be a rule to match this working memory and terminate execution with the appropriate return code. Users may choose to have multiple rules to either report or recover from the error. New values of the resource control should be set when such rules are executed.

We now address the data reduction technique of the invention in the context of fault monitoring and correction in the preferred embodiment. The data reduction is implemented as multiple software event triggers that autonomously and in parallel sense the state of various software and hardware conditions. Unlike prior art systems, these event triggers put information into the working memory directly, a capability that can be provided because these triggers pre-filter the data along a special pathway. When an event occurs the event trigger or triggers update the working memory. A mechanism is provided to ensure that the new working memory element is guaranteed to be more recent than the updates made by the normal recognize-select act sequence of the underlying rule interpreter; consequently the additional working memory elements have the largest timestamps and receive priority for matches in the prior-art-conflict-resolution methods. This mechanism provides a means whereby the rule selected by the rule interpreter can instantiate new working memory elements thereby including the results of prior matches to the working memory, screen memory and system shell; said instantiated working memory elements are available to the event triggers. The working memory items are of four forms. Forms one and two are available in two variations.

The first form is an arbitrary message provided to the event trigger from the rule firing; in the first variation the message is provided in a strict queue-order (FIFO), and in the second variation the message is an urgent message that is placed in FIFO order prior to any non-urgent message.

The result of a message issued in this form are dependent upon the event trigger. The second form is a "set" message which requires the event trigger to set the stated internal variable to the stated value, which may be either numeric or character sequence. The second form can also be issued as a "set incremental" option which requires the event trigger to increase an internal variable by the given amount, and is valid only for numerics. The third form is a "clear" message that requires the event trigger to reset any internal timers that it maintains, and cease from sending any optional alarms. Under this third form any in-progress but incomplete working-memory changes initiated by the event trigger are immediately discarded; this utilizes a synchronization mechanism between the updates that have been initiated by the event trigger and the "clear" message that has been initiated by the currently active rule. The fourth form is a "reset" message that requires the event trigger to restore all internal counters that it maintains.

The event triggers continuously and automatically process an input stream to monitor said input stream and await predetermined events, said events being selected and defined by the expert system. Upon recognition of an event, the event trigger can provide an update to the working memory. The update can be either of two forms. The first form is the "add" form, whereby the event trigger places a new working element which has a time stamp that is larger than any other working memory element thus far placed into the working memory. The second form is a "replace" form, which replaces any working memory that begins with a prefix that is contained in the replacement text, and optionally includes a non-prefix component which is utilized for construction of a new working memory element. The replacement is provided as a deletion of the working memory element(s) with the identical prefix, and then the addition of a new working memory element with the specified prefix and body.

These methods provide several improvements over the prior art in rule-based systems. The first improvement is multiple pathways into working memory, because each event trigger provides a pathway. The second improvement is greatly expanded data analysis capability, as the event triggers can filter large amounts of data that would otherwise exceed the inferential capacity of the prior-art rule-based systems; in the absence of the event triggers an impractical amount of computational processing would be required for the prior art rule based systems to process the data. The XS triggers are situationally invoked and do not place extraneous information into the working memory.

The triggers focus the rule base so that relevant rules can be utilized. The functionality of the triggers is defined by messages that they receive from rules that fire first according to the usual conflict-resolution methods. The triggers continuously evaluate their inputs, and write to the working memory only when relevant conditions are satisfied. The triggers also modify their evaluation methods in response to rule-firing. When a rule fires as part of the prior-art methods for conflict resolution, the rule may provide messages to any sequence of triggers. These messages instruct the event trigger to modify the information. In this manner we achieve rule-based control over the data reduction.

The application to fault tolerance will now be considered. As noted above, myriad faults can occur with automatic remote operations. For example, there is no guarantee that the remote connection will remain available for the duration of the host-to-remote interactions. Dial-on-demand communications software redials a lost connection, but it would be unduly expensive to guarantee a fast restoration time to a non-AT&T overseas telephone. We prefer not to assume that all system components will behave perfectly, particularly in the presence of faults.

As noted above, in the preferred embodiment the working memory represents the state of the host-to-remote interaction. An item of working memory represents an aspect of the system state. This state should not change except when a rule modifies the state (this assumption will be relaxed shortly). For example, a rule that initializes the communications line will change the system state by appropriate modification of the working memory, as in the following stylized example:

(ruleA (match: (bringup Paris. 1)
      (Act: "telnet Paris. 1"
      (add: (Communications Paris. 1 UP)
      (Validate Status)
      (Obtain Updates)))

The communications line should then remain in the given state until deletion of the working memory. Rule activation occurs on the basis of the working memory state, in this case matching the pattern (Communication (.*)$1 UP), as well as many other patterns.

The WM should be logically consistent, in the sense that there are no contradictions between related WMEs. However, faults can create contradictions. Consider the example of ruleA above that initiated communications and indicated this by adding the WME (COMM remote UP). What occurs if the communication is lost? An asynchronous error trigger recognizes the problem, and places an item such as (COMM remote ERROR-DOWN) into the working memory.

There is now an inconsistency in the working memory. It contains both (COMM remote UP) and (COMM remote ERROR-DOWN). As explained below, this inconsistency is recognized and a corrective rule invokes restoration actions, such as recovery of the communication.

Rules provide the definition of a contradiction. Such rules may conclude there is a violation of the proper relationships between the WMEs.

The XS rule interpreter supports this principle by utilizing "rule priorities" and "monitors". Numerical rule priorities give precedence to the rules that detect contradictions. Priorities are important because one rule-action can make multiple WM modifications. Each modification has a unique time-stamp, and is a potential source of a contradiction. A match to the most recently added WME is preferred by the standard conflict resolution, even if a match to an older WME would reveal a contradiction. The contradiction should be identified first.

The earliest possible detection of a contradiction is preferable for the most reliable operations, and therefore fault-detection rules are assigned a higher priority. A high priority rule is eligible for use before any rule with a lower priority. This conflict resolution strategy also facilitates the recognition of urgent data in the shell memory. Fault tolerant actions, in particular screen-based detectors, can be more easily programmed in this manner.

Monitors provide information about external devices and activities. This information is detected at low cost by monitor routines built into the XS interpreter. These monitors are preferably C-language routines custom written for the particular fault in question. XS copies this information into the working memory prior to each recognize cycle.

For reasons of efficiency, we prefer to implement the monitors, when feasible, as threads running as lightweight processes. This avoids the overhead of independent processes in their own address spaces. In particular, the queuing delays are orders of magnitude less with threads than with processes. The improvements of efficiency and simplicity are due to the single address space model of threads, in contrast to the multiple-address space with kernel-based communication for processes. One thread is dedicated to each fault monitor. For example, the Morning Star PPP program includes a log that describes the state of the physical and logical links. The fault monitor scans this file and updates the working memory with a special WME (ppLink logicalLinkStatuspendingActions).

Innovative mechanisms support real-time fault detection and correction. Fault detection routines monitor the external activities, signalling a possible fault by writing a WME indicative of the performance-level or failure. The WME can directly indicate a component failure. Furthermore, the WME can indicate an inferable error in the form of inconsistent global WM. An inconsistency generally implies a possible fault condition.

While some fault detectors locate external problems, others are recognizable from the output of the virtual terminal. For example, the telnet program outputs explicit error messages ("connection closed" or "socket error"). These anomalies are recognized by high priority rules scanning the virtual terminal output. The rules write the error indication to the WM.

Specifically crafted fault tolerance rules can respond to the above fault indications. These rules recognize the diagnostic WMEs, and activate subgoals for further fault diagnosis, restoration and recovery. The effectiveness of this method is a direct result of conflict resolution, where the relevant rules can be indicated by younger WMEs or rule priority. For example, a WME (QuietAlarm FTPD-IN: comment threshold 15 actual 16) activates a rule that includes QuietAlarm FTPD_IN and an appropriate numerical comparison between the threshold value and the actual value. Matching this rule will preempt the normal rule firing order. The rule can then add goals to the WM. Conflict resolution selects these more recent goals. The normal rule cycle then resumes subsequent to satisfaction of these goals.

A fault tolerance method is activated when a screen or thread monitor places an error indication into the WM. The fault tolerance method recovers from the fault by diagnosis and restoration of the service in question. The monitor may optionally provide other corrective actions such as validation of in-process tasks, termination and restart. The two kinds of fault tolerance methods are screen monitors and event triggers:

1. Screen Monitor. A screen monitor is a high-priority rule that scans the virtual terminal input for error conditions. They respond by writing a new WME that can be recognized by a fault-tolerance rule or method.
2. Event Triggers: A thread monitor is a parallel/concurrent subroutine that writes a specialized WME when qualifying condition is found. For example, a monitor can be set to send a quietAlarm if there is no FTPD traffic for a fixed interval. The alarm is placed into working memory.

A fault tolerant method terminates when it no longer matches the WM. This may occur when the fault detector recognizes correction to the fault condition and removes the error indicator from WM. The method can also explicitly disable itself by removing the error indication from WM.

A potential problem is the suspension of a fault tolerant action due to multiple or cascading faults. It is not always appropriate to immediately begin work on a newer fault, particularly if this second fault is a mere secondary effect of the primary one. Mediation of such conflicts is the responsibility of the rule methods. Rules utilize the priority option to specify the relative importance of one correction over another. For example, logging back into the remote system has priority over reissuing a command to the remote. In the event that the line is lost before the login can complete, then restoration of the line receives priority over continuing the login sequence. Logins receive special handling because they have special timing and security constraints.

Rules communicate with monitors by adding special WM of the form:

(ThreadMsg Key msg . . . )

This specifies information that will be routed to any monitor that requests a type "key" message. The monitor can then consume messages with the given key. The specific message syntax for communication with the PPP monitor is presented below.

The monitor can delete, add or replace working memory elements. Each monitor request is placed on a queue of working memory updates. The queue is serviced immediately before the "recognize" cycle in the interpreter. This ensures that fault monitor information receives larger timestamps than the normally executed rules, and therefore greater priority. The WMEs presented by the monitor threads have a syntax to support their recognition. They begin with an identification of the condition (i.e., pppError, pppLink, modemState etc.), followed by informational content, and an optional :comment textfield.

The following is a relatively simple example describing a normal and an erred execution sequence. The rule-set is attempting to achieve the goal of running the standard file transfer program (FTP) to the remote site, and processing commands in ftp-get-config.ho2d322.20. The communications line is lost during this process, and remains unavailable for several minutes. During this time the host attempts multiple redials. By the time the redial succeeds the file transfer process is broken, and the remote machine has further terminated the logical session. Corrective actions include reconnection, relogin, resumption of file transfer from the previously completed step, and resumption of normal processing.

```
[15:36:16 MATCHED ( 120): "getconfig_retrieveA"]
[15:36:18 MATCHED ( 121): "DOFTP1"]
```

| [15:36:17 SENDING | : | "cls<cr>\wftpd<cr> |
| [15:36:18 EXECUTING | : | "cp ftp-get-config.ho2d322.20 ftpCheckpoint.ho2d322.20" |
| [15:36:19 MATCHED ( 122) | : | "AddAwaitFlag"] |
| [15:36:19 MATCHED ( 123) | : | "DOFTP2A"] |
| [15:36:19 EXECUTING | : | "xs-ftp ho2d322.20 Ftp-get-config.ho2d322.20" |
| [15:36:19 MATCHED ( 124) | : | "WatchRunningFTP"] |
| [15:36:19 MATCHED ( 127) | : | "WatchRunningFTP"] |
| THREAD SENDING NONCOMMPACK | : | "Disconnnected down down hangup 13 13" |

THREAD SENDING NONCOMMPACK: "Dialing down down dialing 13 13"
Goal stack shows fault and star of correction

```
0585="pppLink Dialing down down dialing 13 13"
0583="modem Disconnected"
```

-continued

```
0582="EOT Hangup"
0579="WATCH FTP 20"
0570="ACTIVEFTP ftp-get-config.ho2d322.20"
0566="ACTION DOFTP2A PID 4198 ACTIVE"
0564="ACTION DOFTP1 PID 4196 RC 0"
0559="STEP CHKDSK"
0555="ACTION getconfig_waitB PID 4187 RC 0"
... ... ...
... ... ...
```

Communication is lost. Failure detected by monitors and reported

[15:36:39 MATCHED (128): "linkIsDown"]

Interpreter recognizes faulty communications link.
Goal stack shows new goals from linkIsDown rule.

```
587="RESTORECONNECT 0"
586="LINKISDOWN"
0585="pppLink Dialing down down dialing 13 13"
(items 583 and lower follow)
```

System attends continues while waiting for line restoration

```
[15:36:39 MATCHED ( 129): "waitForLink_BRINGUP"]
... ... ...
... ... ...
[15:38:21 MATCHED ( 134): "waitForLink_BRINGUP"]
```

Goal stack shows status of incomplete reconnection attempts

```
0634="EOT NO CARRIER"
0633="modem Call_failed"
0632="modem Dial_failed"
0631="pppLink DialFailed down down dialFailed 13 13"
0629="ACTION waitForLink_BRINGUP PID 4238 RC 1"
0627="RESTORECONNECT 6"
```

Rules detect and monitor number of reconnection attempts

```
[15:38:41 MATCHED ( 135): "countModemFailures_Initial"]
[15:38:41 MATCHED ( 136): "countModemFailures_Subsequent"]
```

FIT processing terminates with failure, due to long reconnection delay.

OUTPUT FROM FTP SUBPROCESS (forked child XS) PID 4198

```
[15:36:26 MATCHED (  1): "start"]
[15:36:34 MATCHED ( 14): "ftpIssueCommand"]
[15:36:35 MATCHED ( 15): "FTPcmdCD_{13}waiting"]
[15:36:40 MATCHED ( 16): "CONNECTEDlinkDownDelay"]
[15:39:08 MATCHED ( 91): "CONNECTEDlinkDownWaiting"]
[15:30:10 MATCHED ( 92): "CONNECTEDshutdown"]
```

Failure is reported to the invoking parent XS

```
[PIDDONE:pid4198rc16completed]
[DEL WM ITEM: ACTION DOFTP2A]
[ADD WM ITEM: ACTION DOFTP2A PID 4198 RC 16]
[15:39:22 MATCHED ( 139): "waitForLink_BRINGUP"]
... ...
... ...
[15:44:08 MATCHED ( 156): "waitForLink_BRINGUP"]
```

Monitor threads post messages on dial status, updating goals

```
("pppLink Connect down up dialed 13 13")
("pppLink Send_LCP_Configure_Req down up configReq 13 13")
("pppLink Rcv_LCP_Configure_Ack down up configAck 13 13")
("pppLink Send_LCP_Configure_Req down up configReq 13 13")
("pppLink Rcv_LCP_Configure_Ack down up configAck 13 13")
("pppLink PPP_connected up up connected 14 13")
```

Recovery actions after link restoration

[15:44:28 MATCHED (157): "linkBackUp_A"]

Restart FTP Processing

[15:44:33 MATCHED (157): "reRunFTPAfterError_16"]

First, clear FTP/FTPD status after error

[15:44:33 MATCHED (159): "clearFTPA"]

Detect cascaded error of lost logical session

```
[15:44:42 MATCHED ( 160): "ErrConnectionClosedA"]
[ADD WM ITEM: TELNET]
[ADD WM ITEM: NeedNewLogin]
[15:44:42 MATCHED ( 161): "continueAfterClear"]
```

Restore logical session by issuing a new login

[15:44:44 MATCHED (162): "RestartTelnetA"]

Rule performs state cleanup and forms subgoals for telnet and login

```
[DEL WM ITEM: "NeedNewLogin" @153da8, item 1]
[ADD WM ITEM: "TELNET"]
[ADD WM ITEM: "DOLOGIN"]
[ADD WM ITEM: "REMOVE READFAILS"]
[ADD WM ITEM: "REMOVE LoginState"]
[ADD WM ITEM: "REMOVE PriorLoginState"]
[ADD WM ITEM: "REMOVE ValidateMatch"]
[15:44:47 MATCHED ( 163): "Remove_ValidateMatch_Done"]
[15:44:47 MATCHED ( 164): "Remove_PriorLoginState_Done"]
[15:44:48 MATCHED ( 165): "Remove_LoginState_Done"]
[15:44:48 MATCHED ( 166): "Remove_ReadFails_Done"]
[15:44:48 MATCHED ( 167): "login_CHARSET"]
[15:44:49 MATCHED ( 168): "login_PASSWORD"]
[15:44:51 MATCHED ( 169): "login_TERMTYPE"]
[15:44:54 MATCHED ( 170): "login_CD_NORMAL"]
```

Once login is complete, incomplete file transfer resumes

[15:44:48 MATCHED (171): "DOFTP1"]

Rule invokes ftp daemon on remote, XS running FTP as local child process

```
[15:44:55 SENDING          :  cls<cr>\wftpd<cr>
[15:44:57 EXECUTING        :  "cp ftpCheckpoint.ho2d322.20
                              ftpCheckpoint.ho2d322.20"
[15:44:57 EXECUTING        :  "XS-FTP ho2d322.20
                              ftpCheckpoint.ho2d322.20"
[15:44:57 MATCHED ( 174)   :  "WatchRunningFTP"]
[15:44:57 MATCHED ( 179)   :  "WatchRunningFTP"]
```

Success is reported to the invoking parent XS

```
[PID DONE: pid 4303 rc 0 completed]
[15:45:28 MATCHED ( 180): "FTPRunWasOK"]
```

Normal rule execution continues in recovered system

```
[15:45:28 MATCHED ( 181): "chkdsk_Start"]
[15:45:34 MATCHED ( 182): "chkdsk_WaitResultB"]
... ...
... ...
```

Rule sequence completes

```
[15:47:12 MATCHED ( 235): "alldone"]
   Rule-name: "alldone"
   Pattern: "Auto>$"
```

System reports resources, terminates all components, returns status code

* Resource utilization report *

| LIMIT-NAME | CURRENT | PRIOR | LIMIT | OVER? | Error? |
|---|---|---|---|---|---|
| Time from start: | 15:47:12 | 15:32:19 | 18000 | (17107) | no |
| Time from match: | 15:47:12 | 15:47:12 | 0 | 0 | ignore |
| Time from stamp: | 15:47:12 | 15:44:53 | 0 | 139 | ignore |
| Rules from start: | 235 | 0 | 5000 | (4765) | no |
| Rules from match: | 235 | 235 | 0 | 0 | ignore |

All recorded threads terminated.
[15:47:13 expert scripter program terminating with rc=0]

Turning as an example to a particular monitor that is implemented in the system, there is one monitor to examine a log of point to point (PPP) communication, including the link status and the packet transfer rates. This examination is nearly independent of the interpreter flow, and can run in parallel on a multiprocessor architecture. The thread maintains the state of the PPP link in the special WM (pppLink statename linkStatus linkStatue note upCount downCount). The thread also monitors the ICMP and TCP traffic, maintaining information on four types of packets (ICMP, TELNET, FTP and FTPDATA) in both directions (out is from the host to the remote, in is from the remote to the host).

The directly monitored information includes:

- the time the last packet was sent or received;
- the number of packets per second for the last five minutes.

The monitor also reports derived quantities:

- seconds without data for a given type;
- packet rate;
- duration to compute the packet rate over.

The alarm bounds are defined when a rule's action adds the ThreadMsg WME. Instead of changing the WM, this sends a message to the threads processing (for example, the monitor loop). Such message has the format:

(ThreadMsg Key msg . . . ). . .

The key and message are thread specific, and are defined as needed for each thread. The ppp monitor responds to messages with the key pppMon and the messages are of the form:

set packet_type direction QUIET seconds
set packet_type direction RATE packet rate INTERVAL seconds
refresh packet_type direction
refresh ALL
clear packet_type direction
clear ALL The set QUIET message defines the maximum time without the given packet type. The set RATE and set INTERVAL messages define the minimum data rate and the duration for which the rate should be computed. The refresh message arms the specified packet type (or all) to fire again, and is equivalent to sending the set messages with their current values. The clear message disables the given alarm (or all) from firing until they are set or refreshed.

Special consideration is given to the clear message to synchronize it with alarms that might be in transit at the time of the clear message. A clear flushes the queue of alarm messages, thereby ensuring that even an alarm that is in the process of being generated will be cleared.

When the derived quantities fall out of range, then an alarm is posted to the WM by writing to the main loop. Alarms are "one shots" that must be reset to permit reuse. The alarm format is thread-specific, and are defined as needed for each thread. The ppp monitor thread writes WMEs of the form:

(pppError packet_type direction error)
(pppLink stateName linkStatus linkStatus note upCount downCount)

where the packet_type is ICMP, TELNET, FTP, or FTPD, the direction is OUT or IN, and the error is QuietAlarm, or LowRateAlarm.

The linkstatus is either up or down. The lineStatus is either up or down. These are sufficient for most diagnostics, although the precise state-name is also stored. The note describes the probable reason for the state. The upCount and downCount show the total number of times the transition to the up (or down) state has been made.

The known stateName values that can modify the linkStatus and lineStatus are: Dialing, Connect, Send_LCP_Configure_Req, Rcv_LCP_Configure_Ack, PPP_connected, SIGINT, SIGHUP, Disconnected, DialFailed, SIGTERM, SEND_LCP_Term_Req, RCV_LCP_Term_Act.

Additional stateNames modify the statistics on ppp packet transmissions, but not the status, note, or count fields. These are Send_ICMP, Send_Telnet, Recv_Telnet, Send_ftp, Recv_ftp, Send_ftp-data, and Recv_ftp-data.

A pppError WME replaces an identical WME. A pppLink WME replaces any WME that begins witty the pppLink prefix.

In summary, a rule modifies the behavior of the ppp monitor thread by adding a ThreadMsg WME. This changes the alarm conditions of the ppp monitor. When an alarm condition occurs, the monitor places a pppError or pppLink WM into the WME. To guarantee synchronous memory modifications and ensure that WM changes occur in a well-defined manner, the monitor thread enqueues the modification request by obtaining a mutual exclusion lock on a shared WM data structure. It then appends the WM modifications to the shared data structure and releases the lock. The rule-interpreter queries the data structure immediately prior to the recognize phase, and makes the specified WM changes. The normal rule cycle can recognize this with an appropriate rule. Since the WME has the most recent timestamp the rule will be recognized before any other rule of equal or lower priority.

The following describes the complete set of fault control structures provided by the XS interpreter in the preferred embodiment:

1. Multi-threaded scanning of communication log (ppp log) for current line status: Select state changes are stored in the XS WM as special WMEs. The first is (pppLink Logical Physical StateName UpCount DownCount). The second is (modem errorStatus) where the status includes Modem_timeout, Device_Failed, and Device_Locked. The scanners also monitor traffic statistics according the number of ICMP, TCP, FTP or FTPD packets per second for each one second interval. Statistics are recorded for each direction (IN from the remote to the central host, and OUT from the host to the remote). The time of the most recent packet is also stored.

2. Concurrent/parallel scanning of virtual terminal input. The virtual terminal accepts input independent of the matching process. Input can scroll off the virtual screen before being a candidate for matching. Such input is printed in the XS output file.

3. Rule priority to override the time-stamp based conflict resolution. The priority field is specified as numeric or symbolic (normal=0, high=100, readscreen=250). Any numeric value may be used.

4. Asynchronous actions, with action-status reflected by WME (ACTION rule RC returnCode) that is automatically maintained by the interpreter. A rule can check the status of the action by matching the (ACTION . . . ) WME. A rule can terminate a running action with the KILLPID (pidno) action.

5. Bi-directional communication between the interpreter loop and the monitor thread program(s). The interpreter loop sends instructions to the monitor loop by adding a WME of the form (threadMsg Key Message) where the Key specifies the monitor-program or monitor-function, and the Message specifies the actions to employ. The monitor code, not the WM, receives this WME. The currently defined threadMsgs specify pppMon as the key, and specify the setting, resetting, and clearing of various alarm conditions (see section 4.4)

The monitor communicates with the interpreter loop by specification of WM changes. The monitor specifies a WM action (Add, Delete, Replace) and a constant expression. For example, the monitor program indicates the state of the ppp link and exceptions to packet contents. Description of the ppp link state uses the (pppLink stateName lineState linkState note upCount downCount) message. Description of alarm conditions uses (pppError packetType direction errorType).

6. An alarm mechanism that permits setting thresholds on traffic rates. This monitors the time in seconds since the last packet, and also the minimum packet rate as defined by an interval and a packet-rate within the interval. These are defined by adding a WME of the form (threadmsg pppMon cmd packetType args). The valid commands are set, setIncremental, clear, and refresh. The valid packet types are ICMP_IN, ICMP_OUT, TCP_IN, TCP_OUT, FTP_IN, FTP_OUT, FTPD_IN and FTPD_OUT. The set command defines both the maximum time since the last packet, and the rate/interval pair that defines the minimum packet rate. The setIncremental defines the maximum time from the current moment until the next packet. These commands have the arguments [Quiet sss] [Rate fff.ff] [Interval sss]. In addition to set and setIncremental are commands refresh and clear. The refresh command resets the alarm's triggered status. The clear command disables the alarm.

The ppp monitor raises an alarm condition when a defined condition is violated. The alarm condition is indicated as a special working memory (quietAlarm packetType: comment threshold actual). Once set an alarm cannot be resent until it is refreshed or redefined. The argument Refresh All refreshes all alarms. To stop recognizing an alarm the condition is cleared with Clear packet-type or Clear all.

7. A "readmore" option determines when to begin the next match operation. This can be immediate or deferred until a combination of asynchronous events. These events are an option to await completion of an action, and an option to await input from the virtual terminal. The options are specified as QS AC QR and AR. The default is QC. One can abbreviate these numerically (0x01=waitForInput, 0x2=waitForAction).

| Short Form | Long Form | Condition for Next Rule Match |
|---|---|---|
| QC | QuietComplete | Wait for Quiescence Completion (screen and action) |
| AC | ActiveComplete | Wait for Action Completion (action, not screen) |
| QR | QuiescentRunning | Wait for Quiescent even if Running (quiesce screen) |
| AR | ActiveRunning | Do not wait at all. |

8. The maximum number of attempts to read from the virtual terminal can be defined by defining the \r variable. If there is a failure to receive new data on the virtual terminal, the system adds a WME (READFAIL rule readcount timeout time-of-day).

As an example, loss of a dialup line triggers a fault monitor, and the consequent WM change can create a contradiction. Consider WMEs (Telnet ACTIVE) and (pppLink Disconnected down down hangup). While the first WME asserts the line is up and that telnet is in use, the second insists the line is disconnected both logically and physically. This is due to a hangup condition. The normal rule sequence should adapt to this unexpected change. A high-priority rule notes the (pppLink Disconnected . . . ) WME. The rule summarizes the state as (LinkState DOWN), and adds a (RestoreLink 0) WME. A second rule attempts to achieve the RestoreLink goal by issuing a UNIX® command. The restoration rule waits a fixed time for restoration, thereby suspending the execution of "normal" rules. The rule records this action by incrementing the numeric counter in the RestoreLink WME. Under normal conditions the line is restored quickly, and new (pppLink PPP-connected up up connected) replaces the prior pppLink WME. A recovery rule now replaces (LinkState DOWN) with (LinkState UP) and deletes the (RestoreLink ##) WME. Normal execution then resumes.

In a more difficult example, the TCP connection may locally disconnect (due to timeout) during restoration. In such cases the virtual terminal may capture appropriate diagnostic messages from the host telnet process. A high priority rule recognizes this diagnostic, and creates the goal of restoring the telnet session. This activates the rules for logging into the remote, which execute upon link restoration.

It is harder to detect the loss of the remote ftpd daemon, due to the TSR activity described above. We therefore infer the state of the ftpd process. If the process cannot be proven active, then it must be assumed to be down. To validate the assumption we save the relevant state of file-transfer information (this checkpoint information is maintained continuously), and terminate the ftp and ftpd processes. These can be restarted safely from the checkpoint.

Additional validation and restart features are provided by each rule set. They assist in recovery of worst-case faults where TCP packets are lost due to session time-outs. The rule-set verifies that its steps are completed, and restarts if necessary.

A number of differences between DOS and UNIX are important in interoperability of the example described herein where the host runs on a UNIX® and the remote systems are DOS. The low level support for these differences is available in the current version of XS. A subsequent version may more directly address the following concerns:

Different file systems. Filenames are different on the two systems. For example, the directory separator (/in UNIX, \in standard DOS), the character set (uppercase-only in DOS), and the length of a filename (varies according to UNIX version). Script writers must currently be cognizant of the system that will process an action or response.

Different command names. The "dir" command for DOS is the "ls" command for UNIX®. This problem can be diminished by use of l3 toolkit or similar UNIX® compatibility tool on the DOS system.

The embodiment described above is designed only for text based single window applications, such as those that run on a VT100 or ANSI standard character based display screen. However, this invention is equally applicable to windowing environments, including graphical displays within each of these windows. A graphical expert system would perform pattern matching on graphic objects, instead of or in addition to words. Application areas include remote control of windows, or X; remote control of GUIs; and control of teleconferencing services and monitoring. Other embodiments and applications are within the scope of the appended claims.

What is claimed is:

1. A memory control system for maintaining a working memory used in connection with an expert system, said memory control system comprising:

a storage device comprising said working memory;

a plurality of event triggers for filtering data that is potentially relevant to the operation of said expert system, each said event trigger comprising a match portion and an action portion; and a processor for: (1) comparing said match portion of at least one of said event triggers to said potentially relevant data; and (2) executing the action portion of any event trigger whose match portion matches said potentially relevant data, said executing comprising modifying said working memory;

wherein said expert system is a system for controlling a plurality of remote processors from a central location.

2. The memory control system of claim 1 wherein said executing comprises adding at least one element to said working memory.

3. The memory control system of claim 2 wherein said element comprises information concerning the status of one component of said expert system.

4. The memory control system of claim 2 wherein said element comprises a portion of said potentially relevant data.

5. The memory control system of claim 1 wherein said expert system comprises a fault detection and correction capability and wherein said working memory stores information relevant to said fault detection-and correction.

6. The memory control system of claim 5 wherein said expert system is a system for controlling a plurality of remote processors from a central location, said remote processors each implementing telephone quality monitoring software.

7. The memory control system of claim 6 wherein said potentially relevant data comprises data concerning communications between said central location and said remote processors.

8. A memory control system for maintaining a working memory used in connection with an expert system, said memory control system comprising:

a storage device comprising said working memory;

a plurality of event triggers for filtering data that is potentially relevant to the operation of said expert system, each said event trigger comprising a match portion and an action portion; and a processor for: (1) comparing said match portion of at least one of said event triggers to said potentially relevant data; and (2) executing the action portion of any event trigger whose match portion matches said potentially relevant data, said executing comprising modifying said working memory;

wherein said processor executes steps (1) and (2) for each of said event triggers independently of each of said remaining event triggers.

9. An expert system for controlling at least one application, said expert system comprising:

a communications link for receiving information potentially relevant to the operation of said expert system;

a storage area for storing data;

a comparator for comparing information received on said communications link to a predetermined set of criteria; and a plurality of event triggers, each said event trigger comprising a match portion and an action portion, said match portions of said event triggers specifying said predetermined set of criteria;

wherein said expert system modifies data stored in said storage area based on results of comparisons performed by said comparator; and wherein said expert system evaluates each of said event triggers for execution independently of each of said other event triggers.

10. An expert system for controlling at least one application, said expert system comprising:

a communications link for receiving information potentially relevant to the operation of said expert system from at least one remote location;

a storage area for storing data; and a comparator for comparing information received on said communications link to a predetermined set of criteria to thereby determine whether said information is relevant to the operation of said expert system;

wherein said expert system modifies data stored in said storage area only if the results of comparisons performed by said comparator indicated that said information is relevant to the operation of said expert system.

11. The expert system of claim 10 further comprising a plurality of event triggers stored in a second storage area, each said event trigger comprising a match portion and an action portion, said match portions of said event triggers specifying said predetermined set of criteria.

12. The expert system of claim 11 wherein said first and second storage areas are portions of a single storage device.

13. The expert system of claim 12 wherein said expert system modifies data in said storage area by adding at least one element to said storage area.

14. The expert system of claim 13 wherein said element comprises information concerning the status of one component of said expert system.

15. The expert system of claim 13 wherein said element comprises a portion of said information received on said communications link.

16. The expert system of claim 11 wherein said expert system executes an action portion of one of said event triggers only if said comparator determines that said match portion of said one of said event triggers matches information received on said communications link.

17. The expert system of claim 10 further comprising a fault detection and correction capability and wherein said storage area stores information relevant to said fault detection and correction.

18. The expert system of claim 17 wherein said expert system is a system for controlling a plurality of remote processors from a central location, said remote processors each implementing telephone quality monitoring software.

19. The expert system of claim 18 wherein said storage area stores information concerning communications between said central location and said remote processors.

20. An expert system for controlling at least one application, said expert system comprising:

a communications link for receiving information potentially relevant to the operation of said expert system;

a storage area for storing data;

a comparator for comparing information received on said communications link to a predetermined set of criteria; and a plurality of event triggers, each said event trigger comprising a match portion and an action portion, said match portions of said event triggers specifying said predetermined set of criteria;

wherein said expert system modifies data stored in said storage area based on results of comparisons performed by said comparator; and wherein said expert system simultaneously evaluates at least two of said event triggers for execution.

21. The expert system of claim 20 wherein said expert system simultaneously executes at least two of said event triggers.

22. An expert system for controlling at least one application, said expert system comprising:
   a communications link for receiving information potentially relevant to the operation of said expert system;
   a storage area for storing data; and
   a comparator for comparing information received on said communications link to a predetermined set of criteria to thereby determine whether said information is relevant to the operation of said expert system;
   wherein said expert system modifies data stored in said storage area only if the results of comparisons performed by said comparator indicated that said information is relevant to the operation of said expert system; and
   wherein said expert system is a system for controlling a plurality of remote processors from a central location.

23. An expert system for controlling at least one application, said expert system comprising:
   a communications link for receiving information potentially relevant to the operation of said expert system;
   a storage area for storing data;
   a comparator for comparing information received on said communications link to a predetermined set of criteria; and
   a plurality of event triggers, each said event trigger comprising a match portion, and wherein said comparator compares said match portion of each event trigger to said information received on said communications link independently of each of said remaining event triggers;
   wherein said expert system modifies data stored in said storage area based on results of comparisons performed by said comparator.

24. A method for maintaining a working memory used in connection with an expert system, comprising the steps of:
   maintaining a plurality of event triggers in a memory device, each said event trigger comprising a match portion and an action portion;
   receiving potentially relevant data over a communications link;
   comparing a match portion of at least one of said plurality of event triggers to said received potentially relevant data; and
   executing the action portion of any event trigger whose match portion matches said potentially relevant data, said-executing comprising modifying said working memory;
   wherein said expert system is a system for controlling a plurality of remote processors from a central location.

25. A system for modifying data stored in a memory used by an expert system comprising:
   a memory for storing data used by said expert system;
   a processor; and
   a plurality of event triggers, each said event trigger comprising a match portion that indicates a predetermined condition and an action portion that specifies a modification to said data in said memory;
   wherein said processor detects the occurrence of a predetermined condition associated with any of said event triggers independently of each of said other event triggers, and implements each action portion of each event trigger whose corresponding predetermined condition is satisfied such that said data in said memory can be independently modified by a plurality of event triggers.

26. The system of claim 25 wherein said modification of said data in said memory comprises adding at least one element to said memory.

27. The system of claim 26 wherein said element comprises information concerning the status of one component of said expert system.

28. The system of claim 26 further comprising a communications link for receiving data and wherein said element comprises a portion of data received on said communications link.

29. The system of claim 25 wherein said expert system is a system for controlling a plurality of remote processors from a central location.

30. The system of claim 25 wherein said expert system comprises a fault detection and correction capability and wherein said memory stores information relevant to said fault detection and correction.

31. The system of claim 30 wherein said expert system is a system for controlling a plurality of remote processors from a central location, said remote processors each implementing telephone quality monitoring software.

32. The system of claim 31 wherein said information relevant to said fault detection and correction comprises information concerning communications between said central location and said remote processors.

33. The system of claim 25 wherein said processor detects said occurrence of said predetermined condition for each of said event triggers independently of each of said remaining event triggers.

34. The system of claim 25 further comprising a second processor and wherein said second processor detects the occurrence of a predetermined condition associated with any of said event triggers simultaneously with said first processor.

35. A method for maintaining a working memory used in connection with an expert system, comprising the steps of:
   maintaining a plurality of event triggers in a memory device, each said event trigger comprising a match portion and an action portion;
   receiving potentially relevant data over a communications link from at least one remote location;
   comparing a match portion of at least one of said plurality of event triggers to said received potentially relevant data; and
   executing the action portion of any event trigger whose match portion matches sad potentially relevant data, said executing comprising modifying said working memory.

36. The method of claim 35 wherein said executing step comprises adding at least one element to said working memory.

37. The method of claim 36 wherein said element comprises information concerning the status of one component of said expert system.

38. The method of claim 36 wherein said element comprises a portion of said received potentially relevant data.

39. The method of claim 35 wherein said expert system comprises a fault detection and correction capability and wherein said working memory stores information relevant to said fault detection and correction.

40. The method of claim 39 wherein said expert system is a system for controlling a plurality of remote processors from a central location, said remote processors each implementing telephone quality monitoring software.

41. The method of claim 40 wherein said received potentially relevant data comprises data concerning communications between said central location and said remote processors.

42. A method for maintaining a working memory used in connection with an expert system, comprising the steps of:

maintaining a plurality of event triggers in a memory device, each said event trigger comprising a match portion and an action portion;

receiving potentially relevant data over a communications link;

comparing a match portion of at least one of said plurality of event triggers to said received potentially relevant data; and executing the action portion of any event trigger whose match portion matches said potentially relevant data, said executing comprising modifying said working memory;

wherein said steps of comparing and executing are carried out for each of said event triggers independently of each of said remaining event triggers.

43. A method for maintaining a working memory used in connection with an expert system, comprising the steps of:

maintaining a plurality of event triggers in a memory device, each said event trigger comprising a match portion and an action portion;

receiving potentially relevant data over a communications link;

comparing a match portion of at least one of said plurality of event triggers to said received potentially relevant data; and executing the action portion of any event trigger whose match portion matches said potentially relevant data, said executing comprising modifying said working memory;

wherein said expert system comprises a plurality of rules and where said rules affect said match portion of at least one of said event triggers.

* * * * *